United States Patent
Gider et al.

(10) Patent No.: US 7,170,713 B2
(45) Date of Patent: Jan. 30, 2007

(54) HEAT SINK FOR A MAGNETIC RECORDING HEAD

(75) Inventors: Savas Gider, Mountain View, CA (US); Wenchein Hsiao, San Jose, CA (US); Vladimir Nikitin, Campbell, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 40 days.

(21) Appl. No.: 10/215,230

(22) Filed: Aug. 8, 2002

(65) Prior Publication Data

US 2004/0027719 A1   Feb. 12, 2004

(51) Int. Cl.
  *G11B 5/127* (2006.01)
(52) U.S. Cl. .................................... 360/128
(58) Field of Classification Search ............... 360/128, 360/126, 123, 125, 313, 317, 234.5, 234.6, 360/234.7, 244.5
See application file for complete search history.

(56) References Cited

U.S. PATENT DOCUMENTS

| | | | |
|---|---|---|---|
| 4,405,961 A | 9/1983 | Chow et al. | 360/129 |
| 5,278,713 A | 1/1994 | Zucker | 360/128 |
| 5,793,578 A | 8/1998 | Heim et al. | 360/126 |
| 5,935,644 A | 8/1999 | Heim et al. | 427/116 |
| 6,105,381 A | 8/2000 | Ghoshal | 62/259.2 |
| 6,181,514 B1 | 1/2001 | Santini et al. | 360/126 |
| 6,381,094 B1 | 4/2002 | Gill | 360/126 |
| 6,396,660 B1 | 5/2002 | Jensen et al. | 360/126 |
| 6,455,174 B1* | 9/2002 | Takao et al. | 428/632 |
| 6,700,752 B2* | 3/2004 | Dimitrov et al. | 360/317 |
| 6,760,191 B1* | 7/2004 | Yan et al. | 360/128 |
| 6,859,343 B1* | 2/2005 | Alfoqaha et al. | 360/126 |
| 6,909,674 B2* | 6/2005 | Ju et al. | 369/13.17 |
| 2002/0081778 A1* | 6/2002 | Inoue et al. | 438/122 |
| 2002/0154451 A1* | 10/2002 | Dimitrov et al. | 360/317 |
| 2003/0039067 A1 | 2/2003 | Lee et al. | 360/126 |
| 2003/0048578 A1 | 3/2003 | Kikuchi et al. | 360/123 |
| 2003/0067716 A1* | 4/2003 | Chhabra et al. | 360/234.5 |
| 2003/0067717 A1* | 4/2003 | Garfunkel et al. | 360/234.5 |
| 2004/0070870 A1* | 4/2004 | Hsiao et al. | 360/126 |
| 2004/0223257 A1* | 11/2004 | Santini | 360/125 |
| 2005/0024957 A1* | 2/2005 | Gider et al. | 365/200 |
| 2005/0068671 A1* | 3/2005 | Hsu et al. | 360/125 |
| 2005/0094319 A1* | 5/2005 | Han et al. | 360/319 |

FOREIGN PATENT DOCUMENTS

| | | |
|---|---|---|
| JP | 09-167314 | 6/1997 |
| JP | 2001-236614 | 8/2001 |

OTHER PUBLICATIONS

Korean Intellectual Property Office—Notice Requesting Submission of Opinion date Nov. 18, 2005.

\* cited by examiner

*Primary Examiner*—Allen Cao
(74) *Attorney, Agent, or Firm*—Patterson & Sheridan, L.L.P.

(57) ABSTRACT

An effective heat sink is provided for a magnetic recording head. The heat sink conducts heat away from the recording head thus limiting the range of temperatures to which the recording head is subjected. A heat sink on a recording head significantly reduces heat induced protrusion.

6 Claims, 4 Drawing Sheets

HEAT SINK FOR A MAGNETIC RECORDING HEAD

BACKGROUND OF THE INVENTION

1. Field of the Invention

This invention relates generally to a magnetic recording head used in a disk drive, and more particularly to a magnetic recording head incorporating a heat sink.

2. Description of the Background Art

Disk drives using magnetic recording of digital information store most of the information in contemporary computer systems. A disk drive has at least one rotating disk with discrete concentric tracks of data. Each disk drive also has at least one recording head typically having a separate write element and read element for writing and reading the data on the tracks. The recording head is constructed on a slider and the slider is attached to a suspension. The combination of the recording head, slider, and suspension is called a head gimbal assembly. In addition, there is an actuator which positions the recording head over the specific track of interest. The actuator first rotates to seek the track of interest and after positioning the recording head over the track, maintains the recording head in close registration to that track. The disk in a disk drive has a substrate and a magnetic layer on the substrate for magnetic recording. The slider carrying the recording head has a disk facing surface upon which an air bearing is constructed. The air bearing allows the slider to float on a cushion of air and to be positioned close to the disk surface. Alternatively, the slider surface facing the disk can be adapted for partial or continuous contact with the disk.

The recording head is formed from various metals and is separated from the body of the slider by a thin insulating layer. The value of the coefficient of thermal expansion of the materials in the recording head is generally higher than the corresponding value for the insulating layer or the slider. Therefore as the temperature of the recording head and slider is increased, the physical expansion is greater for the recording head than for the insulating layer or the slider. The rise in temperature is most noticeable during writing when write current is passed through the write element of the recording head. During writing, heat is generated in the coils by Joule heating, and in the magnetic portion of the yoke by Eddy current heating. Upon heating, the recording head may protrude several nanometers out of the air bearing surface of the slider toward the disk because of the mismatch in thermal expansion coefficients and higher temperature in the region close to the coil compared with the slider body.

The flying height of the slider above the disk surface is generally lower for each new family of disk drive products to facilitate achieving ever higher densities of recorded information. The required flying heights are now comparable with the amount of recording head protrusion caused by temperature increases during writing. Contact between the recording head and the disk can cause damage to the recording head and can also lead to wear failure at the interface between the recording head and the disk.

The alternate contact recording apparatus allows contact between the slider and the disk. However, while a slider surface may be constructed to allow partial or continuous contact with the disk, a recording head which protrudes from the disk facing surface of a slider is subject to excessive wear damage.

Thus, the mismatch between the thermal expansion coefficients of the recording head and the slider leading to protrusion of the recording head is an increasingly serious problem.

SUMMARY OF THE INVENTION

In a preferred embodiment, the invention provides an effective heat sink for a recording head. The heat sink thus provided dissipates heat effectively and therefore limits the temperature excursions in the recording head. The present invention substantially improves the temperature induced protrusion of the recording head.

In one embodiment, a heat sink is embodied as a heat conducting layer disposed between the read element and the write element of the recording head. In an alternate embodiment, a heat sink is embodied as a heat conducting layer disposed over the write element. In another alternate embodiment, a heat sink is embodied as a heat conducting layer disposed between two layers of turns in the coil of the write element. The heat conducting layers in the embodiments are formed from a suitable material such as copper. A heat conducting layer may be in contact with or connected to the slider to increase the heat dissipation. In another embodiment, the heat sink is provided with a heat conducting portion and a smaller insulating portion.

In an alternate embodiment, a disk drive is provided wherein the recording head is provided with a heat sink.

Other aspects and advantages of the invention will become apparent from the following detailed description, which when taken in conjunction with the drawings, illustrate by way of example the principles of the invention.

DETAILED DESCRIPTION OF THE INVENTION

The invention is embodied in a heat sink which effectively dissipates heat from a recording head. The heat sink limits the temperature excursions of the recording head and therefore limits the amount of protrusion of the recording head from the disk facing surface of a slider. The risk of wear damage to the recording head and the risk of interface damage between the recording head and the disk is significantly reduced.

Figure 1:
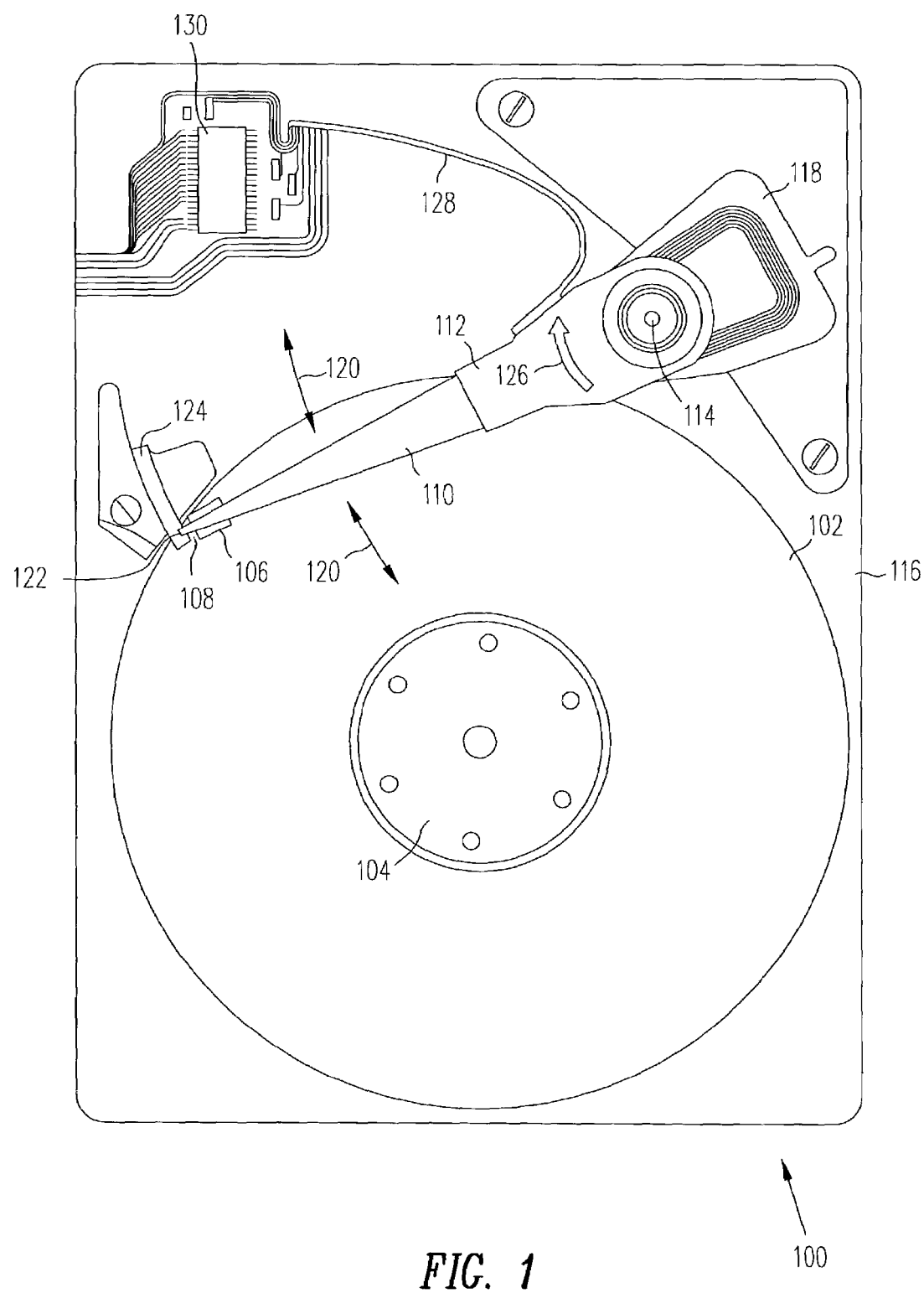
FIG. 1 illustrates a top view of a disk drive having a recording head with a heat sink.

Referring to FIG. 1, a magnetic disk drive 100 has at least one rotatable magnetic disk 102 supported by a spindle 104 and rotated by a motor (not shown). There is at least one slider 106 with an attached recording head 108 and heat sink (described in detail below) positioned over the disk 102 surface while reading and writing. The slider 106 is attached to a suspension 110 and the suspension 110 is attached to an actuator 112. The actuator 112 is pivotally attached 114 to the housing 116 of the disk drive 100 and is driven by a voice coil motor 118. As the disk is rotating, the actuator 112 positions the slider 106 along with the suspension 110 radially or along an arcuate path 120 over the disk 102 surface to access the data track of interest.

Referring to FIG. 1, during operation of the disk drive 100, the motion of the rotating disk 102 relative to the slider 106 generates an air bearing between the slider 106 and the disk 102 surface which exerts an upward force on the slider 106. This upward force is balanced by a spring force from the suspension 110 urging the slider 106 toward the surface of the disk 102. Alternatively, the slider 106 may be in either partial or continuous contact with the disk 102 surface during operation.

FIG. 1 also shows an optional load/unload tab 122 on the distal end of the suspension 110. This load/unload tab 122 operates in conjunction with a load/unload fixture 124 to lift the slider 106 away from the disk 102 surface when the disk drive 100 is turned off or enters a power saving mode. When an unload operation is initiated, the actuator 112 rotates far enough in a clockwise direction 126 such that the load/unload tab 122 then slides up the load/unload fixture 124 gently lifting the slider 106 off of the disk 102 surface. FIG. 1 also shows the electrical connection 128 as wires or a flex cable between the recording head 108 and the preamplifier 130.

Figure 2:
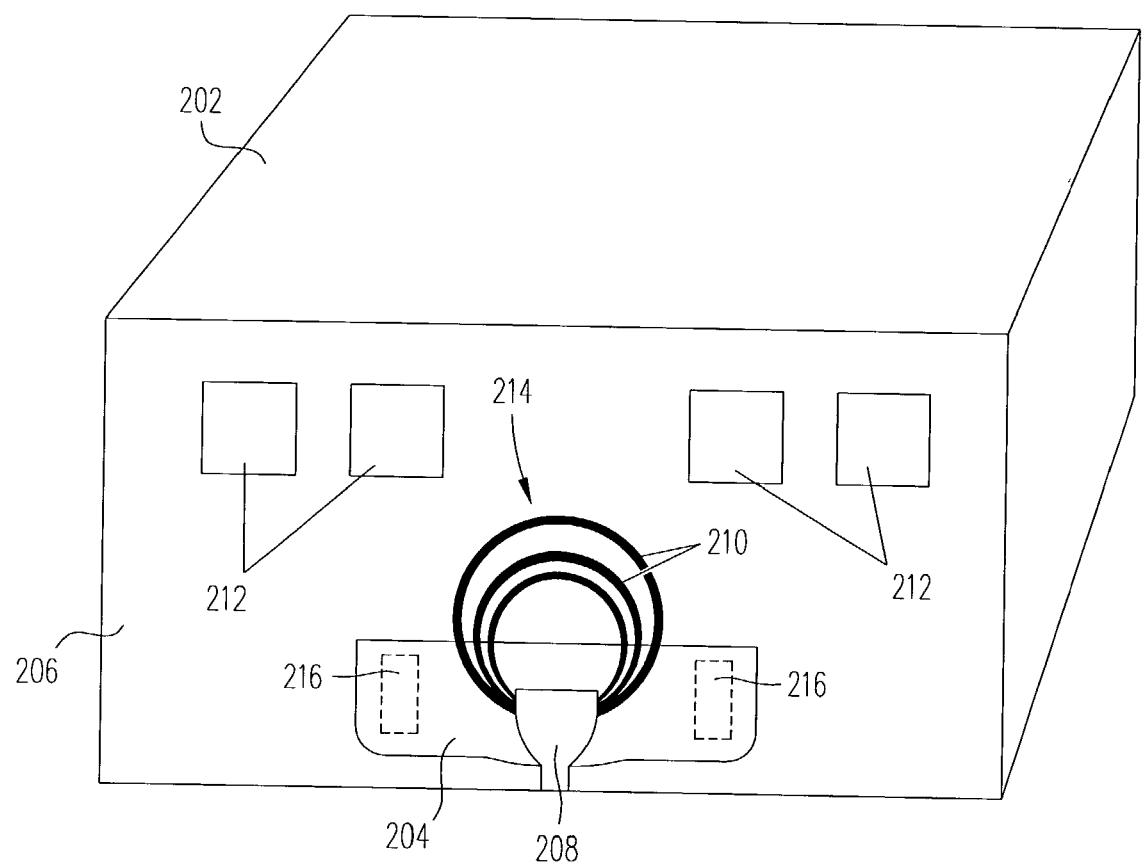
FIG. 2 illustrates a perspective view of a slider and a recording head with a heat sink.

FIG. 2 shows a more detailed view of a slider 202. The recording head and heat sink 204 are preferably constructed on the trailing surface 206 of the slider 202. FIG. 2 illustrates the upper pole 208 and the turns 210 of the coil 214 of the write element of the recording head. The read element is not illustrated in FIG. 2. The electrical connection pads 212 which allow connection with the write element and read element are illustrated. One embodiment of a heat sink 204 is illustrated in FIG. 2. This embodiment of the heat sink is a layer of heat conductive material physically close enough to the coil 214 and at least one of the poles 208 of the write element to be effective in conducting heat away from the write element. A ceramic composite of titanium carbide and alumina is commonly used to form sliders. This material is a better heat conductor than the substantially pure alumina commonly used to separate the recording head from the slider. Thus, the heat sink is somewhat more effective if a portion of the heat sink is in physical contact, or connected, with the slider. FIG. 2 illustrates two areas 216 of the heat sink conductive layer 204 which are in contact with the trailing surface 206 of the slider 202 through openings (described in more detail below) in the underlying insulation layer (not shown).

Figure 3:
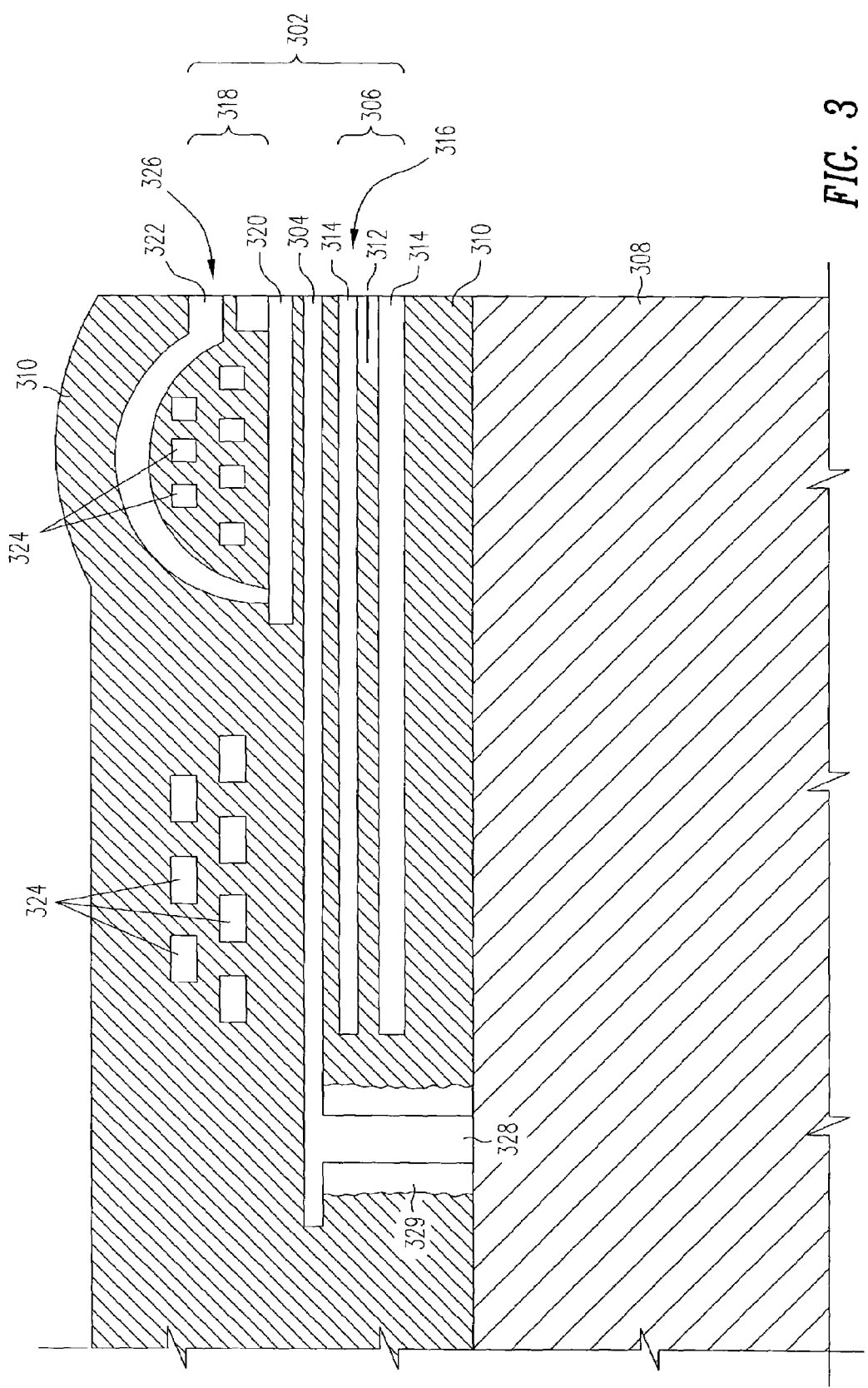
FIG. 3 illustrates a cross sectional view of a recording head having a heat sink disposed between the write element and read element.

FIG. 3 illustrates a cross sectional view of a typical recording head 302 and one embodiment of a heat sink 304. The recording head 302 typically has a read element 306 which is separated from the slider body 308 by a layer 310 of insulating material. The read element 306 has a thin film sensor 312 and two magnetic shield layers 314. The read element 306 typically has an exposed end 316 for communicating with the disk (not shown). The write element 318 has a lower 320 and upper pole 322 and turns 324 forming a coil disposed between the poles 320, 322. The poles 320, 322 of the write element 318 have exposed ends 326 for communicating with the disk (not shown). Both the read element 306 and write element 318 are usually surrounded by insulation material except for the exposed ends 316, 326.

There may be a very thin protective layer of carbon material formed over the exposed ends 316, 326 to retard corrosion of the write 318 and read 306 elements. A recording head with a thin carbon overcoat is considered to have exposed ends for purposes of magnetically communicating with the disk. The heat sink 304 in FIG. 3 is embodied as a layer of heat conducting material disposed between the read element 306 and the write element 318. One or more openings 329 in the insulation 310 allowing a portion 328 the heat conducting material of the heat sink 304 to be in contact with the slider 308 incrementally improves the heat conduction.

Figure 4:
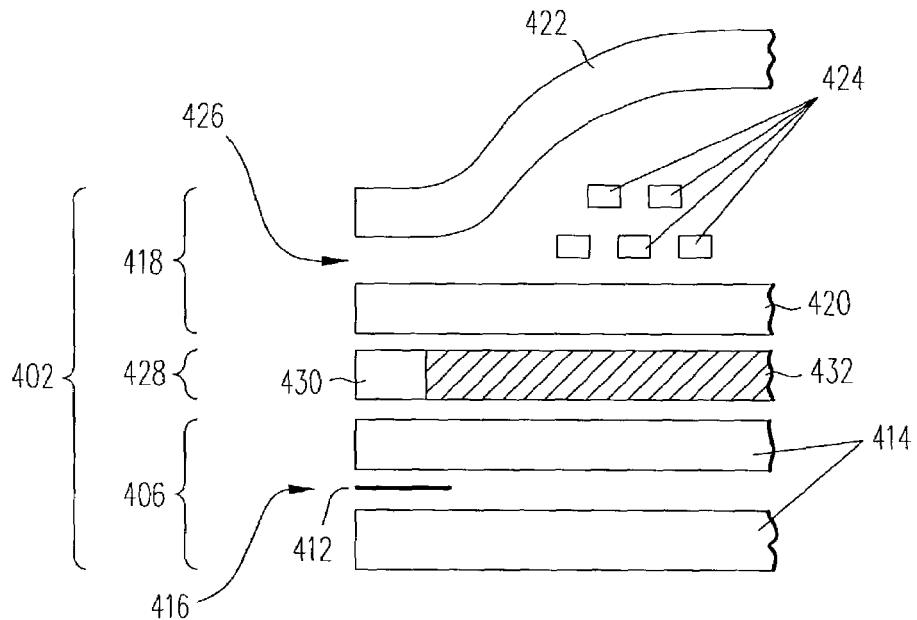
FIG. 4 illustrates a detailed cross sectional view of a recording head having a heat sink disposed between the write element and read element.

FIG. 4 illustrates an expanded view of a recording head 402 having an embodiment of a heat sink. The write element 418 of the recording head has an upper pole 422 and a lower pole 420. The write element 418 also has coil turns 424 and an exposed end 426 for communicating with the disk (not shown). The read element 406 has two shields 414, a read sensor 412, and an exposed end 416 for communicating with the disk (not shown). The heat sink illustrated in FIG. 4 is embodied as a layer 428 disposed between the write element 418 and read element 406. In the particular embodiment illustrated in FIG. 4, the heat sink layer 428 has one portion 432 composed of a heat conducting material, preferably with a high thermal conductivity, and another smaller portion 430 composed of an insulating material. The insulating portion 430 is positioned near the exposed ends of the write element 426 and read element 416. The insulating portion 430 of the heat sink, preferably formed of a stable insulator such as alumina, helps protect the heat conducting portion 426 from possible corrosion or wear. Alternatively, the smaller portion 430 may be formed from a stable capping material such as permalloy or other alloy of nickel and iron.

Figure 5:
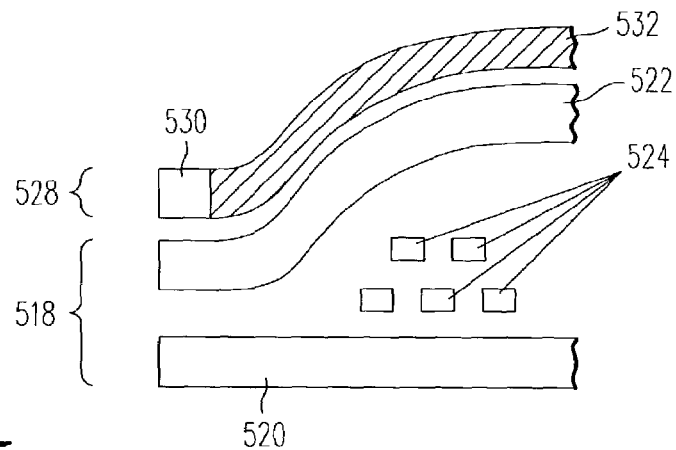
FIG. 5 illustrates a cross sectional view of a recording head wherein a heat sink is formed over the upper pole of the write element; and, FIG. 6 illustrates a cross sectional view of a recording head having a heat sink disposed between the layers of the turns in a write element coil.

FIG. 5 illustrates an alternative embodiment of a heat sink. In this embodiment, the heat sink is comprised of a layer 528 formed over the upper pole 522 of the write element 518. The heat sink layer 528 has a portion 532 formed from a heat conducting material and an optional portion 530 formed from an insulator. The lower pole 520 and the turns 524 of the write coil are illustrated.

Figure 6:
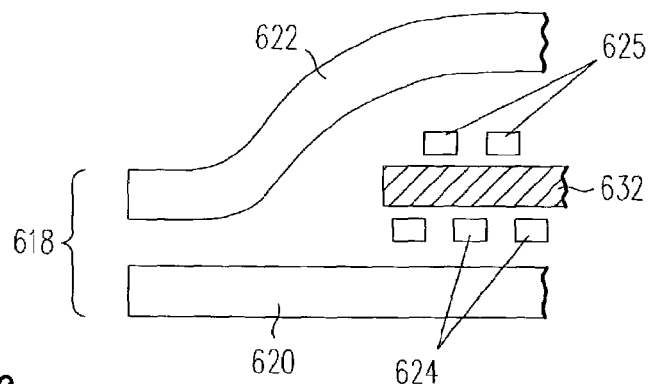

The heat sink may be embodied as a heat conducting layer positioned adjacent to the turns in the write head coil. This configuration of the heat sink provides for an effective heat sink since a primary heat source is the heat generated in the coil during writing. FIG. 6 illustrates a specific embodiment of a heat sink which comprises a heat conducting layer 632 disposed between the turns 624, 625 of a two layer coil in a write element 618. The write element 618 has a lower pole 620 and an upper pole 622.

In the embodiments of the heat sink discussed above, the heat conducting material may be formed from any suitable material. Copper is a preferred heat conducting material because the heat conductivity is high and a copper layer is easily constructed by known methods of electroplating or vacuum deposition. The coil of the write element is usually formed from copper. Magnetic materials are not as suitable for use as heat conductors because of the possible interference with the function of the write or read elements. The optional insulating portion of the heat sink may conveniently be formed from alumina which is widely used in recording head construction as an insulator. Other insulating materials such as silicon oxide are known to those skilled in the art. The methods of forming the heat sink are well known to those skilled in the art and include forming a mask, plating, sputtering or other suitable techniques.

In numerical experiments simulating an increase in temperature due to writing, recording heads having a heat sink indicated a temperature increase as low as 70% compared with the temperature increase for recording heads which did not have a heat sink. Correspondingly, the temperature induced protrusion was reduced by up to 30% for recording heads having a heat sink compared with recording heads without a heat sink.

From the foregoing it is apparent that the invention provides an effective heat sink for a recording head. The embodiments of the heat sink significantly limit the increase in temperature of the recording head and significantly reduce the temperature induced recording head protrusion. Although this invention has been described with respect to specific embodiments, the details thereof are not to be construed as limitations for it will be apparent that various embodiments, changes, and modifications may be resorted to without departing from the spirit and scope thereof, and it is understood that such equivalent embodiments are intended to be included within the scope of this invention.

We claim:

1. A magnetic recording head conjoined with a trailing surface of a slider, comprising:
   a write element having an exposed end;
   a read element having an exposed end; and
   a heat sink disposed between said write element and said read element, wherein a portion of said heat sink is connected with said trailing surface of said slider and said heat sink comprises a heat conductive portion and an insulating portion, said insulating portion extending to the exposed ends of the write element and read element, wherein the read element comprises a first magnetic shield and a second magnetic shield, and wherein the heat sink is disposed outside of an area between the first magnetic shield and the second magnetic shield.

2. The magnetic recording head of claim 1, wherein the write element comprises a first pole and a second pole, and wherein the heat sink is disposed outside of an area between the first pole and the second pole.

3. A magnetic recording head conjoined with a trailing surface of a slider, comprising:
   a write element having an exposed end;
   a read element having an exposed end; and
   a heat sink disposed between said write element and said read element, wherein a portion of said heat sink is connected with said trailing surface of said slider and said heat sink comprises a heat conductive portion and an insulating portion, said insulating portion extending to the exposed ends of the write element and read element wherein said insulating portion of said heat sink is comprised of alumina, wherein the read element comprises a first magnetic shield and a second magnetic shield, and wherein the heat sink is disposed outside of an area between the first magnetic shield and the second magnetic shield.

4. The magnetic recording head of claim 3, wherein the write element comprises a first pole and a second pole, and wherein the heat sink is disposed outside of an area between the first pole and the second pole.

5. A magnetic recording head conjoined with a trailing surface of a slider, comprising:
   a write element having an exposed end, the write element comprising:
   a first pole;
   a second pole; and
   one or more coils disposed between the first pole and the second pole;
   a read element having an exposed end, the read element comprising:
   a first magnetic shield;
   a second magnetic shield; and
   a read sensor disposed between the first and second magnetic shield; and
   a heat sink disposed between the write element and the read element, wherein a portion of the heat sink is connected with the trailing surface of the slider and the heat sink comprises a heat conductive portion and an insulating portion, the insulating portion extending to the exposed ends of the write element and read element wherein the insulating portion of the heat sink is comprised of alumina, wherein the heat sink is disposed outside of an area between the first pole and the second pole, and wherein the heat sink is disposed outside of an area between the first magnetic shield and the second magnetic shield.

6. The magnetic recording head of claim 5, wherein the heat sink comprises:
   a first heat conductive portion extending to the exposed ends of the write element and read element, wherein the first heat conductive portion is parallel to the first magnetic shield; and
   a second heat conductive portion extending from the first heat conductive portion to the trailing surface of the slider, wherein the second heat conductive portion extends perpendicular to the first heat conductive portion.

* * * * *